Dec. 22, 1942. P. H. GUGGER 2,306,120
METHOD OF MOLDING AND PRODUCTS RESULTING THEREFROM
Filed March 8, 1940
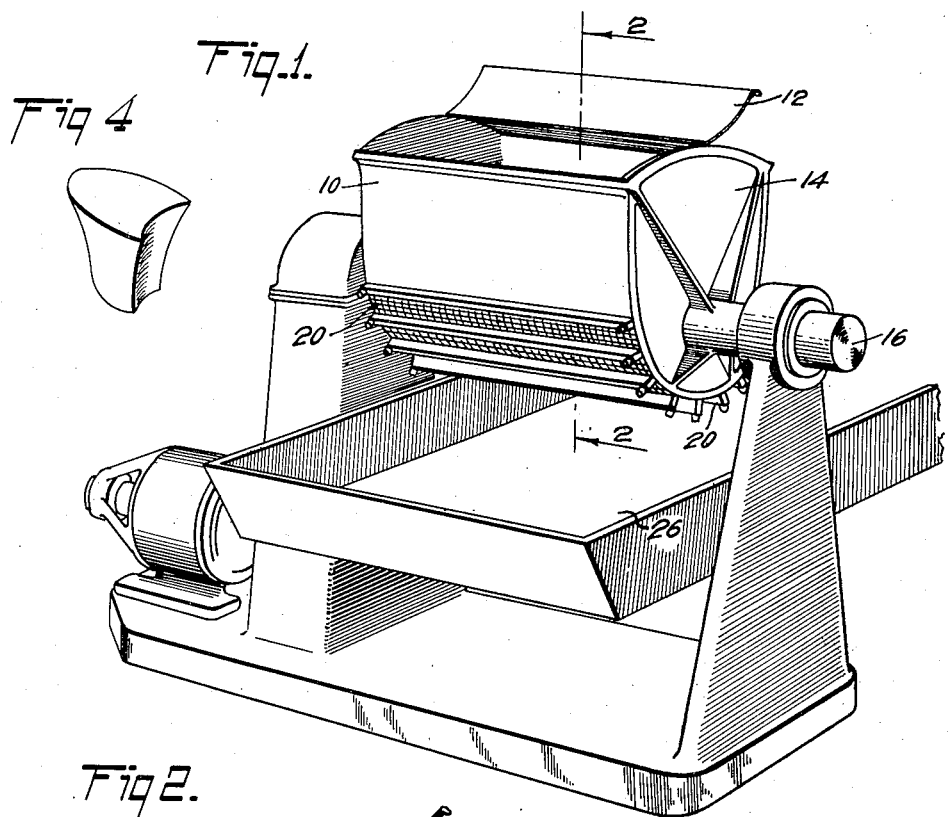
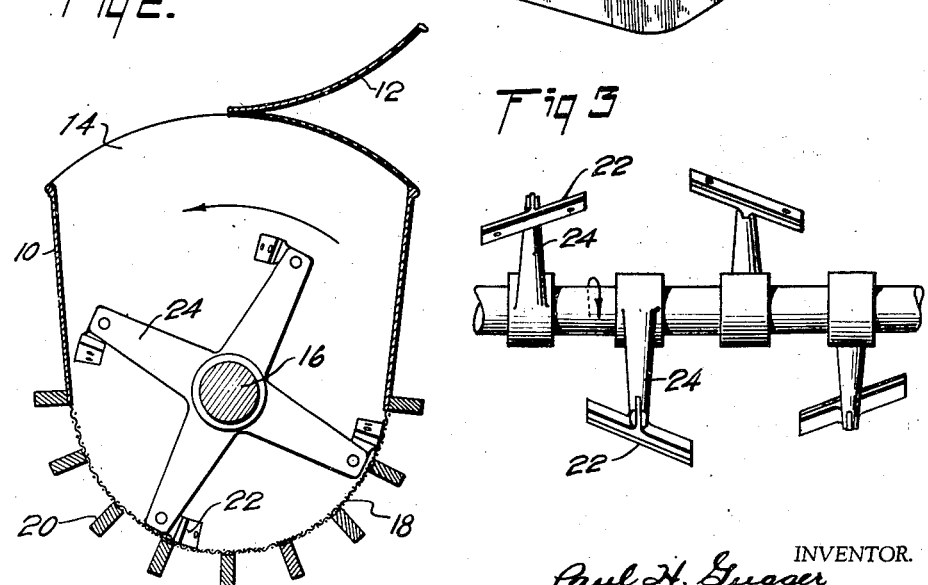
INVENTOR.
Paul H. Gugger
BY Brown & Jones
ATTORNEYS Patented Dec. 22, 1942

2,306,120

UNITED STATES PATENT OFFICE 2,306,120

METHOD OF MOLDING AND PRODUCT RESULTING THEREFROM

Paul H. Gugger, Great Neck, N. Y., assignor to Comolite Corporation, Long Island City, N. Y., a corporation of New York Application March 8, 1940, Serial No. 322,912

17 Claims. (Cl. 106—163)

This invention relates to a method of molding and products resulting therefrom.

In general, it is an object of the invention to provide a method of the character described, which will efficiently perform the purposes for which it is intended, which is simple and economical, which can be expeditiously, conveniently and safely carried out, and the apparatus for which can be readily manufactured and assembled.

Another object of the invention is to provide a method of molding a mixture containing starch into an object having a sufficiently low water content that the object may be held to a uniform size with other similar objects; and to provide a method of molding wherein such material is so prepared that it can be readily inserted into the molds; to provide such a method in which the usually dough-like material is changed into somewhat fluffy workable state; to provide a machine which can bring about this change in the prescribed mixture of these substances; and to provide a final product which is strong, not flexible, and of exceedingly low cost.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description, taken in connection with the accompanying drawing, in which:

Figure 1 is a perspective view of a device embodying one form of the invention and capable of carrying out one step of the invention;

Fig. 2 is a vertical, side-wise view, in cross-section, of the device shown in Fig. 1;

Fig. 3 is a view in elevation of a part of the device shown in Fig. 1; and

Fig. 4 is a perspective view of a product of the invention.

Shoe heels have been made from glue and sawdust hardened together in the proper form. Those heels have had the drawback that they cannot be held to size, owing, to a great extent, to the large water content and the ensuing shrinkage. They were relatively expensive.

The present invention contemplates a shoe heel, and other articles usually manufactured from wood substitutes or wood compositions, in which there is almost as much starch as sawdust, which does not have the drawbacks mentioned, and which is relatively inexpensive. The method steps described below in connection with particular materials in particular amounts and carried out by the apparatus described have been discovered after long research and after many completely unsatisfactory results were obtained when other proportions, steps, and apparatus were used.

In carrying out the invention, about one hundred ten pounds of comminuted wood, preferably hard-wood sawdust, such as maple, is mixed with about eighty pounds of starch. It is desirable that the former be capable of passing through a thirty-mesh screen and that the latter be tapioca flour. They may be thoroughly mixed in a double arm mixing machine of the dough mixer type for from five to ten minutes. To this mixture there is preferably added about thirty-five pounds of water in which a pound of an alkali, e. g., calcium hydroxide, has been dissolved. The water is thoroughly introduced into the mixture. The kneading action of a double arm mixer may accomplish this. Live steam is injected into the mixture until the final water content thereof is about twenty-five percent.

The steam treatment leaves the material more or less in the condition of lumpy bread dough. It is handled with difficulty and is not suitable for manipulation into the molding forms. It is therefore treated to make it more available for molding.

The mixture is divided into a multiplicity of units which are assembled in a heap. The method of division is such that the mixture, in physical form and consistency, very roughly resembled a heap of warm brown sugar.

A machine for this dividing is shown in Fig. 1 in which 10 denotes a trough with cover 12 and ends 14 through which latter passes a shaft 16 turned by some convenient source of power. The bottom of the trough is formed of netting 18, the interwoven elements of which have a square cross section about three-sixteenths of an inch on a side. These elements are of metal and are arranged to leave roughly square interstices about seven-sixteenths of an inch long on a side. Longitudinal, or other, supports 20 for the netting may be placed against the outside thereof. Scrapers 22 carried by arms 24 fixed to shaft 16 are carried past and against the netting. The scrapers may be set so as not to be parallel to the axis of shaft 18. They may be shorter than the axial length of the netting and may be staggered with respect to each other. A receptacle 26 is provided to receive the material which has been pushed through the netting by the scrapers.

The material which has passed through the netting may be described as fluffy as compared to its condition when inserted hot into the trough. It is somewhat granular in that pieces of the material come through the netting in relatively uniform granular particles of a size roughly comparable to a grain of rice. In this last state it is readily manipuated in appropriately sized quantities and inserted into the molds. The assemblages of small pieces flow quite readily under pressure at room temperature to a uniform solid mass. A pressure of about five thousand pounds per square inch, for a three second period, is usually sufficient. The heels or other articles are then ejected from the molds and placed on a rack to dry. During drying the heels or other articles shrink uniformly to their final size at which time they contain only about eight percent of water.

The dried heel block can then be finished in any of the conventional manners such as sandpapering, lacquering and attaching a leather toplift, or by simply attaching a leather top-lift to the heel block as it comes from the drier as this produces a novelty heel having the appearance and color of cork, or by covering the heel block with leather, fabric, or any of the many other materials ordinarily employed to match the upper part of the shoe to which the heel is to be attached and then attaching a top-lift.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of molding comprising forming a mixture consisting substantially of about five parts of comminuted wood, about four parts of starch, and water in an amount sufficient to give a water content of about one-quarter, and molding said mixture into an article.

2. A method of molding comprising forming a mixture consisting substantially of about one hundred and ten parts by weight of comminuted wood with about eighty parts by weight of tapioca flour and sufficient water to give a water content of about one-quarter, and molding said mixture into an article.

3. A method of molding comprising forming a mixture consisting substantially of about one hundred and ten parts by weight of hard-wood sawdust with about eighty parts by weight of tapioca flour and sufficient water to give a water content of about one-quarter, and molding said mixture into an article without the addition at any time during said method of substantially any fusible binder or substantially any glue to the before-mentioned materials.

4. A method of molding comprising forming a mixture consisting substantially of about one hundred and ten parts by weight of comminuted wood with about eighty parts by weight of tapioca flour and a solution of about one part by weight of an alkali in about thirty-five parts by weight of water, and adding sufficient steam to give a total water content of about one-quarter, and molding said mixture into an article.

5. A method of molding comprising forming a mixture consisting substantially of about one hundred and ten parts by weight of comminuted wood with about eighty parts by weight of tapioca flour and a solution of about one part by weight of calcium hydroxide in about thirty-five parts by weight of water, and adding sufficient steam to give a total water content of about one-quarter, and molding said mixture into an article without the addition at any time during said method of substantially any fusible binder or substantially any glue to the before-mentioned materials.

6. A method of molding comprising forming a mixture consisting substantially of about five parts of comminuted wood, about four parts of starch, and water in an amount sufficient to give a water content of about one-quarter, molding the resultant mixture into units, and drying said units until the water content thereof is about one-twelfth of the total weight.

7. A method of molding comprising forming a mixture consisting substantially of about one hundred and ten parts by weight of comminuted wood with about eighty parts by weight of tapioca flour and sufficient water to give a water content of about one-quarter, molding the resultant mixture into units having the shape of shoe heels, and drying said units until the water content thereof is about one-twelfth of the total weight and completing the molding without the addition, at anytime during said method, of substantially any fusible binder or of substantially any glue to the before-mentioned materials.

8. A method of molding comprising forming a mixture consisting substantially of about five parts of comminuted wood, about four parts of starch, and water in an amount sufficient to give a water content of about one-quarter, granulating the resultant mixture into particles, and molding the particles together.

9. A method of molding comprising forming a mixture consisting substantially of about five parts of comminuted wood, about four parts of starch, and water in an amount sufficient to give a water content of about one-quarter, granulating the resultant mixture into particles the largest of which have a maximum area of cross-section of about one-sixteenth of a square inch, and molding the particles together.

10. A method of molding comprising forming a mixture consisting substantially of about five parts of comminuted wood, about four parts of starch, and water, some of which is in the form of steam, in an amount sufficient to give a water content of about one quarter, granulating the resultant mixture, while hot, into particles, and molding the particles together without the addition, at anytime during said method, of substantially any fusible binder or of substantially any glue to the before-mentioned materials.

11. A method of molding comprising forming a mixture consisting substantially of about five parts of comminuted wood, about four parts of starch, and water, some of which is in the form of steam, in an amount sufficient to give a water content of about one quarter, granulating the resultant mixture, while hot, into particles the largest of which have a maximum area of cross-section of about one-quarter of a square inch, and molding the particles together without the addition, at anytime during said method, of substantially any fusible binder or of substantially any glue to the before-mentioned materials.

12. A molded article consisting substantially of about five parts of comminuted wood and four parts of starch and water.

13. A molded article consisting of about five parts of comminuted wood and four parts of starch and substantially no glue or fusible binder and having a water content which has been reduced from about one-quarter to about one-twelfth of the total weight of the article.

14. A molded article consisting of about five parts of comminuted wood and four parts of starch, said article having been molded from granulated particles comprising said wood and said starch.

15. A molded article consisting substantially of about five parts of comminuted wood and four parts of starch and water and substantially no glue or fusible binder, and having the shape of a shoe heel.

16. A molded article consisting of about five parts of comminuted wood and four parts of starch and substantially no glue or fusible binder, said article having been molded in the shape of a shoe heel from granulated particles comprising said wood and said starch.

17. A shoe heel consisting substantially of sawdust and starch and water and substantially no glue or fusible binder.

PAUL H. GUGGER.